(No Model.)
G. H. DAY.
VELOCIPEDE.
No. 521,761. Patented June 19, 1894.
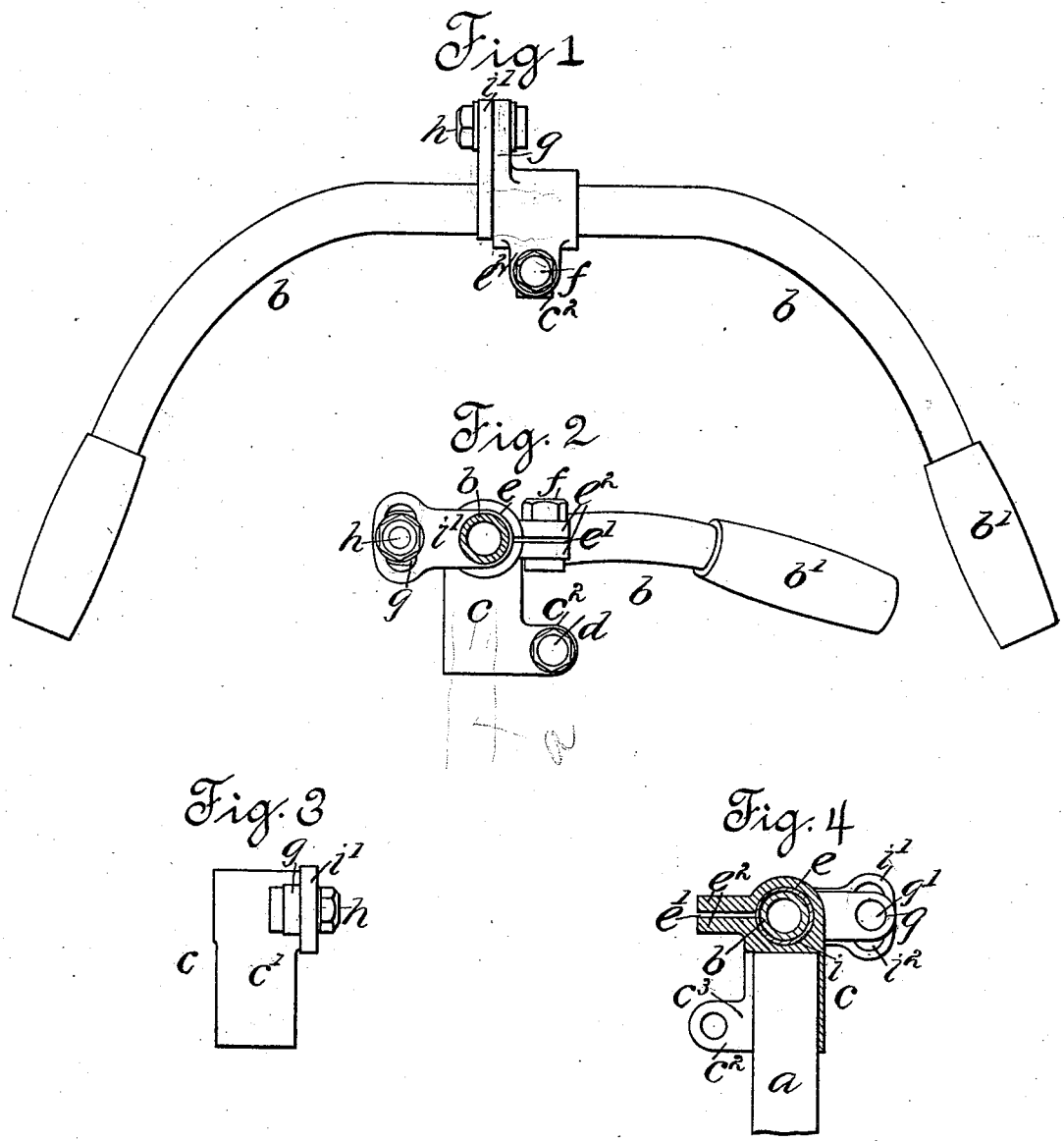
Witnesses
Chas. B. Chandler
G. B. Jenkins.
Inventor
George H. Day.
by Chas. L. Burdett
Attorney

UNITED STATES PATENT OFFICE.

GEORGE H. DAY, OF HARTFORD, CONNECTICUT, ASSIGNOR TO THE POPE MANUFACTURING COMPANY, OF BOSTON, MASSACHUSETTS.

VELOCIPEDE.

SPECIFICATION forming part of Letters Patent No. 521,761, dated June 19, 1894.

Application filed April 20, 1892. Serial No. 429,866. (No model.)

*To all whom it may concern:*

Be it known that I, GEORGE H. DAY, of Hartford, in the county of Hartford and State of Connecticut, have invented certain new and useful Improvements in Velocipedes, of which the following is a full, clear, and exact description, whereby any one skilled in the art can make and use the same.

My invention particularly relates to the class of vehicles known as velocipedes, and the object of my invention is to provide a vehicle of this class, as a bicycle more particularly, with a handle that may be readily adjusted to different heights.

To this end my invention consists in the details of the several parts making up the handle and the adjusting means, and in their combination, as more particularly hereinafter described and pointed out in the claim.

Referring to the drawings:—Figure 1 is a detail top view of a bicycle handle embodying my invention. Fig. 2 is a detail view in section through the handle at one side of the steering post and in side view of the adjustable fastening. Fig. 3 is a detail front view of the adjusting device. Fig. 4 is a detail view in section through the clamp.

In order to accommodate the several parts of a tricycle or safety bicycle to different persons who may ride it it has been found necessary to provide some means of changing the level of the handle bar so as to raise or lower the handles that are secured to the outer ends of the handle bar. This has been accomplished in prior machines by fastening the handle bar to a rod that is located in a socket in the steering post and has a telescopic movement in such socket and a clamp to secure the rod firmly to the steering post when the handle is at the desired level.

In the accompanying drawings the letter $a$ denotes the steering post of a bicycle or other like vehicle, $b$ the handle bar on the ends of which are formed or secured the handles $b'$, and to this handle bar is attached, midway of its length, a socket piece $c$. This socket piece comprises a tubular portion $c'$ that is adapted to fit snugly upon the top of the steering post $a$ and to be clamped thereto as by means of a bolt $d$ that passes through the ears $c^2$ arranged on opposite sides of a slot or channel $c^3$, the bolt having on one end the head resting on the outer surface of one of the ears and on the other end a nut resting against the outer surface of the other ear, and by means of this bolt the socket piece can be clamped securely to the upper end of the steering post. At the top of the socket piece there is a transverse opening $e$ forming a handle socket, and this socket has the wall along one side split lengthwise, as by a slot $e'$, and has ears $e^2$ arranged on opposite sides of this slot with a bolt $f$ passing through the ears and serving, in connection with a nut, as a means of clamping the handle firmly within the socket. An arm $g$ projects from the socket piece, preferably at one side, and is provided with a bolt hole $g'$ for the purpose of affording a support for a bolt $h$ that extends through a slot $i^2$ in the arm $i'$ that projects from a sleeve $i$ that is secured to the handle bar $b$. The sleeve is used in order to allow room in the handle socket through which to slip a curved handle bar and of course is not a necessary feature of the device. It is only requisite that the arm $i'$ shall project from the handle bar in such position as to enable it to be clamped to the arm $g$, as it is by means of this device that the exact level of the handles is determined.

The parts having been arranged as shown in Figs. 1 and 2 of the drawings the level of the handles may be readily changed by unclamping the part forming the handle socket and the two arms and rocking the handle bar in the socket until the handles have been raised or lowered to the desired level. The parts are then again reclamped and the handles secured at the required level. This affords a ready means of conveniently and accurately adjusting the handles to any desired level.

It is evident that the socket piece $c$ and its immediate connected parts may be made integral with the steering post if desired, it only being necessary to the embodiment of my invention that there shall be a handle socket arranged transversely at the top of the steering post with adjusting and clamping means to enable the bar to be rocked in the socket to hold it in any desired fixed position.

I claim as my invention—

In combination with the steering post of a bicycle or like vehicle, a socket piece removably secured thereto, a transverse handle socket through the socket piece, clamping means for securing the handle in the socket, projecting arms from the socket piece and the handle bar respectively, and a clamping bolt whereby the arms are secured against sliding movement on each other, all substantially as described.

GEORGE H. DAY.

Witnesses:
CHAS. L. BURDETT,
J. S. COPELAND.